United States Patent [19]

Spinner

[11] 4,025,149

[45] May 24, 1977

[54] LONGITUDINALLY SEALED INSULATING SUPPORT ARRANGEMENT FOR HF-COAXIAL CONNECTORS

[76] Inventor: Georg Spinner, Erzgiessereistr. 33, 8 Munich 2, Germany

[22] Filed: July 22, 1975

[21] Appl. No.: 598,045

[30] Foreign Application Priority Data

July 29, 1974 Germany .......................... 2436495

[52] U.S. Cl. ........................ 339/177 R; 277/188 R; 277/190

[51] Int. Cl.$^2$ ..................... H01R 17/08; F16J 15/10

[58] Field of Search ....................... 339/60, 94, 177; 174/75 C, 88 C, 77; 277/188, 190; 285/348

[56] References Cited

UNITED STATES PATENTS

| | | | |
|---|---|---|---|
| 2,368,744 | 2/1945 | Carey | 277/188 A |
| 2,611,007 | 9/1952 | Cade et al. | 174/77 R |
| 2,765,204 | 10/1956 | Josephson | 277/188 A |
| 3,314,683 | 4/1967 | Schmidt et al. | 277/188 A |
| 3,474,391 | 10/1969 | Gartzke et al. | 339/177 E |
| 3,493,670 | 2/1970 | Broadbelt et al. | 339/94 M |

FOREIGN PATENTS OR APPLICATIONS

| | | | |
|---|---|---|---|
| 1,037,546 | 8/1958 | Germany | 339/177 R |
| 1,189,172 | 3/1965 | Germany | 339/177 R |
| 1,101,562 | 3/1961 | Germany | 174/88 C |

*Primary Examiner*—Roy Lake
*Assistant Examiner*—Neil Abrams
*Attorney, Agent, or Firm*—Ostrolenk, Faber, Gerb & Soffen

[57] ABSTRACT

A longitudinally sealed insulating support arrangement for coaxial cable connectors comprising two support discs interposed between the inner and outer conductors, an elastic sealing means between the discs and the discs being pressed together; the shape of the discs and sealing means are described.

5 Claims, 4 Drawing Figures

LONGITUDINALLY SEALED INSULATING SUPPORT ARRANGEMENT FOR HF-COAXIAL CONNECTORS

This invention relates to a longitudinally sealed insulating support arrangement for HF-coaxial connectors, consisting of two component discs and a sealing means arranged between them which, when the two component discs are axially braced, is pressed tightly both against the outer conductor and against the inner conductor.

In known insulating support arrangements of this kind, two individual sealing rings are arranged in an outer and an inner annular space formed between outer and inner bevels of the opposite end ring surfaces of the component discs. In these known arrangements, the component discs have to be axially braced both against the outer conductor and against the inner conductor until the central end ring surfaces of the two annular discs come into contact with one another. Accordingly, the inner conductor has to be formed with an annular groove which in turn means that the inner conductor has to be made in two parts. In these and other known insulating support arrangements, the sealing means has to be fixedly arranged in the inner and outer conductor arrangement, with the result that, in practice, dismantling and reassembly can only be carried out by experts. On the other hand, arrangements are also known in which, in particular, sealing with respect to the inner conductor is obtained by providing the bore of the insulating disc with an outwardly extending groove-like radial indentation in which is placed an O-ring of rubber or any other equivalent elastic insulating material.

Although an arrangement of this kind enables a one-piece smooth inner conductor to be introduced into and sealed off in the disc, it is nevertheless attended by the disadvantage that inexpert introduction of the inner conductor frequently results in damage to the sealing ring. Another disadvantage of this arrangement is that it also requires a sealing means for sealing the insulating disc with respect to the outer conductor. In addition, a sealing arrangement of this kind is particularly unfavourable so far as small connectors are concerned, i.e. connectors in which the diameter of the inner conductor is less than 4 mm, because in that case the indentations are extremely difficult to produce. In addition, the O-ring subsequently fitted has such small dimensions that a completely smooth, tight fit around the periphery is no longer guaranteed.

The object of the present invention is to provide an insulating support arrangement which is easy to assemble and dismantle and which guarantees reliable longitudinal sealing both along the outer conductor and along the inner conductor.

In an insulating support arrangement of the type described above, this object is achieved, in accordance with the invention, by virtue of the fact that the sealing means is in the form of a one-piece elastic sealing disc of which the internal diameter is smaller than the diameter of the associated inner conductor section and by virtue of the fact that, at their opposite end ring surfaces in the vicinity of the inner conductor, the component discs have such a degree of freedom that the sealing disc is deformed in the manner of a lip seal by the inner conductor introduced into it. This provides for a satisfactory sealing effect and prevents the sealing disc from being damaged, even in cases where the inner conductor has sharp edges and is inexpertly introduced.

The insulating support arrangement according to the invention is particularly suitable for coaxial connectors in whose case the connection between the inner conductor of the cable and the inner conductor of the connector has to be established at the assembly point. In this case, it is necessary to obtain reliable sealing of the connector after assembly with minimal costs in the manufacture of the connector. One factor which has to be taken into consideration in this respect is that skilled personnel are not always available at the assembly site. Assembly should be carried out with minimal outlay. Contrary to all known arrangements where a separate sealing system is provided for the internal conductor of the connector and for the outer conductor of the connector, the annular sealing disc according to the invention provides both for an outer seal and an inner seal.

In one advantageous embodiment of the invention, the sealing disc is shaped at its outer periphery into an annular bead which is brought radially outwards into sealing contact with the outer conductor by conical pressure surfaces of the component discs. The spape of the sealing disc has to be adapted to the shape of the opposite end ring surfaces of the component discs of the insulating support. In one preferred embodiment of the invention, the sealing disc has parallel edges in its inner and middle sections and then changes into an outer annular bead of circular cross-section. The outer conical surface of the two component discs of insulating material, which cooperates with the annular bead, has an angle of preferably about 75° relative to the axis. In another preferred embodiment of the invention, the conical surface is adjoined radially inwards by a narrow end ring surface which presses into the parallel-edge section of the sealing disc and which is adjoined inwards by a conical recess which has an angle of about 45° and forms the space which accommodates the parallel-edge inner section of the sealing disc when the sealing disc is fitted on to the inner conductor.

The arrangement according to the invention is of particular advantage because there is no need for axial bracing against the inner conductor, with the result that the inner conductor can be made smooth and in one-piece, which considerably simplifies assembly.

One exemplary embodiment of the invention is described in the following with reference to the accompanying drawings, wherein.

Figure 1:
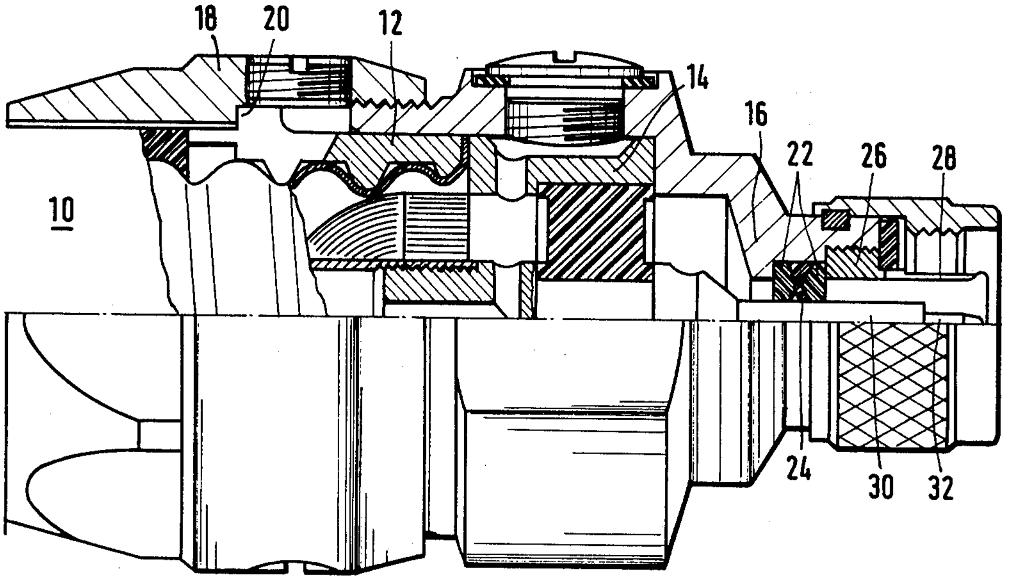
FIG. 1 is a section through an HF-coaxial connector with an insulating support according to the invention fitted to a Flexwell cable.

FIG. 1 shows a coaxial connector fitted to a Flexwell cable 10. The coaxial connector consists of a nut 12 which is screwed onto the corrugations of the cable and over whose end ring surface is flanged the end of the outer conductor tube against which the outer conductor 14 is braced from the other side by means of the sleeve 16 of the external conductor of the connector, onto which is screwed a clamping ring 18 which surrounds the insulating sheath of the cable and which is axially supported by a step 20 in the ring 12. The insulating support according to the invention consists of the two component discs 22 of insulating material and of the sealing disc 24 arranged between them. These components forming the insulating support are described in detail hereinafter in reference to FIGS. 2 and 3. As can be seen from FIG. 1, the left-hand component disc 22 rests on the bottom of a recess and a ring nut 26 is screwed from the other side into the sleeve 16 of the outer conductor of the connector, axially bracing the sealing disc 24. In the embodiment illustrated, the ring nut 26 carries the jack 28 of the outer conductor.

As can be seen from FIG. 1, the insulating support arrangement 22, 24 is arranged on the one-piece smooth inner conductor 30 which, at its right-hand free end, comprises a tapered connector section 32.

The insulating support arrangement may readily be assembled by introducing the smooth inner conductor 30 into the insulating support of the prepared connector sleeve 16 during assembly of the connector in situ, the sealing ring having enough space in which to deform around the inner conductor to prevent damage, although a satisfactory sealing effect is ultimately guaranteed by the lip-like seal.

Figure 2:
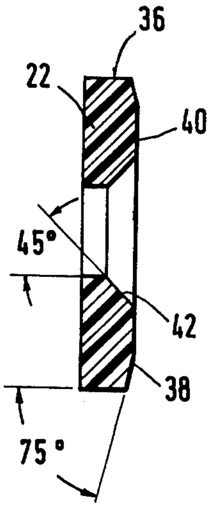
FIG. 2 is a section through one of the component discs of the insulating support.
Figure 3:
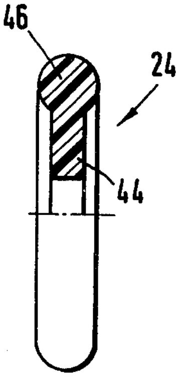
FIG. 3 is a section through the sealing disc arranged between the two component insulating discs.
Figure 4:
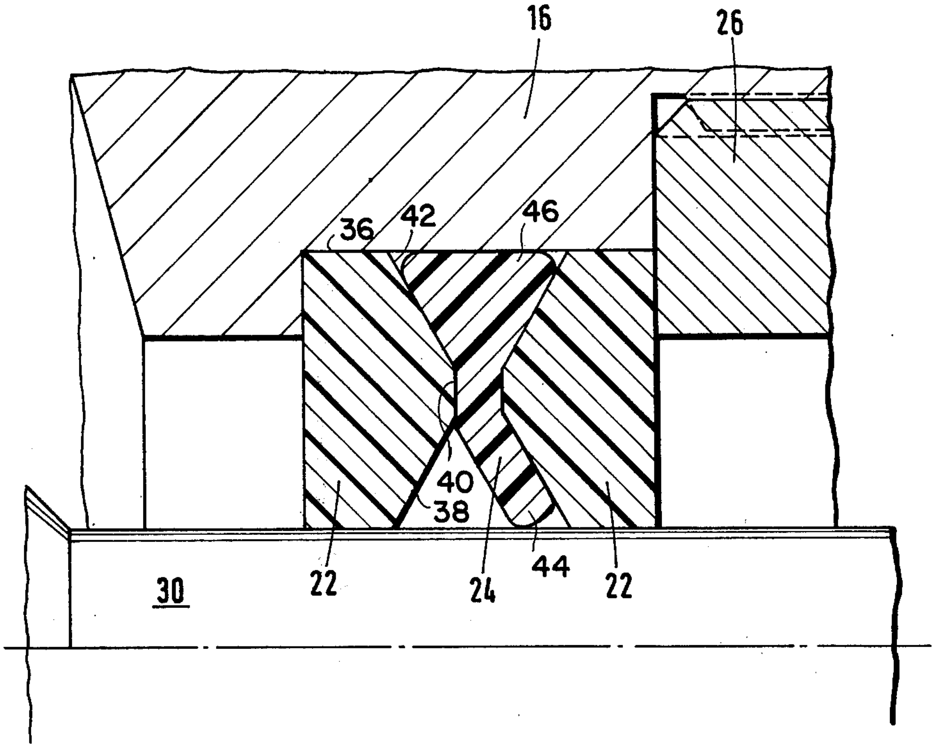
FIG. 4 shows a detail of FIG. 1, namely the position of the sealing disc held tight in its fitted position, on a larger scale.

FIG. 2 shows one of the two identical component discs, whereas FIG. 3 shows the sealing disc 24 on the same scale. FIGS. 2 and 3 shown dimensions in order to clarify the parameters to be selected in one exemplary embodiment. However, the invention is by no means confined to the dimensions and forms illustrated which may be modified in certain ways. However, in the case of relatively large insulating support arrangements, the dimensions can be expected to change substantially proportionally.

As can be seen from FIG. 2, the component insulating disc designed for an inner conductor 3 mm in diameter has an inner diameter of the same size (plus any tolerance). The cylindrical outer surface 36 has the same diameter, i.e. 10 mm as the recess in the outer sleeve 16 of the connector. Each component disc has a conical end ring surface 38 with an angle of 75° relative to the axis. This section 38 is adjoined radially inwards by a narrow end ring surface 40 which is perpendicular to the axis and which in turn is adjoined by a conical recess 42 which has an angle of 45° relative to the axis.

The sealing disc 24 consists of an inner section 44 with parallel edges and of an outer bead 46 of circular cross-section. As can be seen from the dimensions indicated, the sealing disc has an internal diameter which is smaller than the nominal diameter of the associated inner conductor, although its diameter is selected in such a way that the disc can readily be fitted on to the inner conductor.

Under the axial bracing effect (for which the ring nut 26 is responsible in the embodiment illustrated in FIG. 1), the inner part of the sealing disc 24, as shown in FIG. 1, is displaced into the space formed by the conical recesses 42 in the component insulating discs, which provides for a form of lip seal with respect to the inner conductor 30 to be subsequently introduced. The bead 46 is deformed between the conical end ring surfaces 38 of the component discs so that a sealing fit is obtained with respect to the outer conductor. For dismantling, the connector sleeve 16 can be correspondingly removed from the inner conductor 30 without any need for the insulating support or a section of the inner conductor to be removed beforehand.

I claim:

1. A longitudinally sealed insulating support arrangement for HF coaxial connectors, or the like, comprising:

a pair of component discs separated from each other; each said component disc having a first opening therethrough of a first diameter; each said component disc having a respective facing side facing toward said facing side of the other said component disc; each said facing side having a radially inner section that is tapered inwardly into its said component disc moving radially inwardly on the said component disc;

a sealing disc interposed between and engageable with said facing sides of said component discs; said sealing disc being comprised of elastic material; said sealing disc having a second opening therethrough of a second diameter which is less than said first diameter;

said sealing disc having a first thickness between the sides of said sealing disc; said sealing disc being sufficiently thin that the portion thereof located between said component disc radially inner sections is elastically deflectable toward either of said radially inner sections;

an annular bead of generally circular cross section and of greater thickness than said first thickness extending around the periphery of said sealing disc;

said first and second openings being aligned, whereby an object of said first diameter that is passed through said openings will deform said sealing disc against a said radially inner section of one said component disc;

said component disc facing sides each also having a radially outer section, radially outward of its said radially inner section, and each said radially outer section tapers inwardly into its said component disc moving radially outwardly on the said component disc, whereby a generally wedge shaped pressure surface is defined by both said radially outer sections said wedge shaped pressure surfaces being shaped and positioned to engage said sealing disc bead and bias it radially outwardly.

2. The insulating support arrangement of claim 1, wherein said component discs and said sealing disc are all arranged side by side on a common axis; said radially inner section of each said component disc facing side being tapered at an angle of about 75° relative to said axis; said radially outer section of each said component disc facing side being tapered at an angle of about 45° relative to said axis.

3. The insulting support arrangement of claim 2, wherein said component disc facing sides each have a ring section between its said radially inner and its said radially outer sections and each said ring section is perpendicular to said axis.

4. In combination, the insulating support arrangement of claim 1 and an HF connector arrangement, said connector arrangement comprising:

an inner conductor having an outer diameter that is said first diameter; all said discs being seated on said inner conductor;

a sleeve surrounding and radially spaced from said inner conductor; a recess in said sleeve which opens towards said inner conductor and in which all of said component discs and said sealing disc are seated; means engaging said component discs in said recess to press same toward each other thereby also to compress said sealing disc; said component discs being pressed together such that said sealing disc is pressed against one said radially inner section of a said component disc and said bead is in engagement with both facing component disc said radially outer sections;

said sleeve recess having an inner diameter; said component discs having an outer diameter approximating said sleeve recess inner diameter, such that compression of said sealing disc bead squeezes said bead against said sleeve in said recess.

5. The combination of claim 4, further comprising an outer conductor surrounding said inner conductor; said sleeve being an extension of said inner conductor.

* * * * *